(12) United States Patent
Grewal et al.

(10) Patent No.: US 12,451,980 B2
(45) Date of Patent: Oct. 21, 2025

(54) COMPANION OR AUXILIARY UNIT FOR TESTING USER DEVICES WITH A TELECOMMUNICATION NETWORK

(71) Applicant: T-Mobile USA, Inc., Bellevue, WA (US)

(72) Inventors: Harwinder Grewal, Bothell, WA (US); Satya Prakash Karey, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 63 days.

(21) Appl. No.: 18/461,981

(22) Filed: Sep. 6, 2023

(65) Prior Publication Data

US 2025/0080247 A1   Mar. 6, 2025

(51) Int. Cl.
*H04B 17/15* (2015.01)
*H04B 17/14* (2015.01)

(52) U.S. Cl.
CPC ............. *H04B 17/15* (2015.01); *H04B 17/14* (2015.01)

(58) Field of Classification Search
None
See application file for complete search history.

(56) References Cited

U.S. PATENT DOCUMENTS

| | | | |
|---|---|---|---|
| 7,962,762 B2 | 6/2011 | Kirsch et al. | |
| 8,284,682 B2 | 10/2012 | Huq et al. | |
| 9,119,080 B2 | 8/2015 | Jactat et al. | |
| 9,667,692 B2 | 5/2017 | Sand et al. | |
| 10,681,570 B2 | 6/2020 | Doshi et al. | |
| 11,297,513 B2 | 4/2022 | Agarwal et al. | |
| 11,503,460 B2 | 11/2022 | Sheng et al. | |
| 2008/0188216 A1 | 8/2008 | Kuo et al. | |
| 2009/0156198 A1* | 6/2009 | Lee | H04W 24/08 455/425 |
| 2015/0177277 A1* | 6/2015 | Nickel | G01R 31/2822 324/629 |
| 2020/0106532 A1* | 4/2020 | Leather | H04B 17/20 |

FOREIGN PATENT DOCUMENTS

| | | |
|---|---|---|
| EP | 1391861 A2 | 2/2004 |
| KR | 100523997 B1 | 10/2005 |
| KR | 100725002 B1 | 6/2007 |
| KR | 100764009 B1 | 10/2007 |

\* cited by examiner

*Primary Examiner* — Wilson Lee
(74) *Attorney, Agent, or Firm* — Perkins Coie LLP

(57) ABSTRACT

Mobile devices located across remote areas of a telecommunication network are tested using companion or auxiliary units that are coupled to the mobile devices. The units have a portable and/or compact configuration, thereby enabling easy distribution to remotely-located network subscribers, and the units each include an onboard memory subunit (e.g., a hard drive), an onboard antenna, a peripheral interface, and a controller subunit. A unit, when coupled to a mobile device (e.g., via a wired peripheral connection), determines network operations to be performed by the mobile device via a telecommunication network in order to test a compatibility of the mobile device with the network. The unit causes the mobile device to perform the network operations and obtains device system data of the device, the device system data being logged by the device during the device's performance of the network operations. The unit then provides the obtained data for analysis.

11 Claims, 7 Drawing Sheets

COMPANION OR AUXILIARY UNIT FOR TESTING USER DEVICES WITH A TELECOMMUNICATION NETWORK

BACKGROUND

Routine testing, maintenance, and development of a telecommunication network and the network user devices connected thereto are critical for the telecommunication network to continue providing reliable communication services to the network user devices (and for the devices to continue receiving the same). Testing can span at least two domains, one being the device-side and the other being the network-side, and at least these two domains together form a more complete picture needed to better understand and resolve potential issues, incompatibilities, and faults of the network and/or the devices. A need exists to accurately manage both domains in concert during testing of the telecommunication network and its devices. The fact that today's telecommunication networks are extraordinarily expansive—with network user devices being scattered across different areas remote from telecommunication network systems—presents further obstacles and challenges to network testing and device testing.

BRIEF DESCRIPTION OF THE DRAWINGS

Detailed descriptions of implementations of the present invention will be described and explained through the use of the accompanying drawings.

Figure 1:
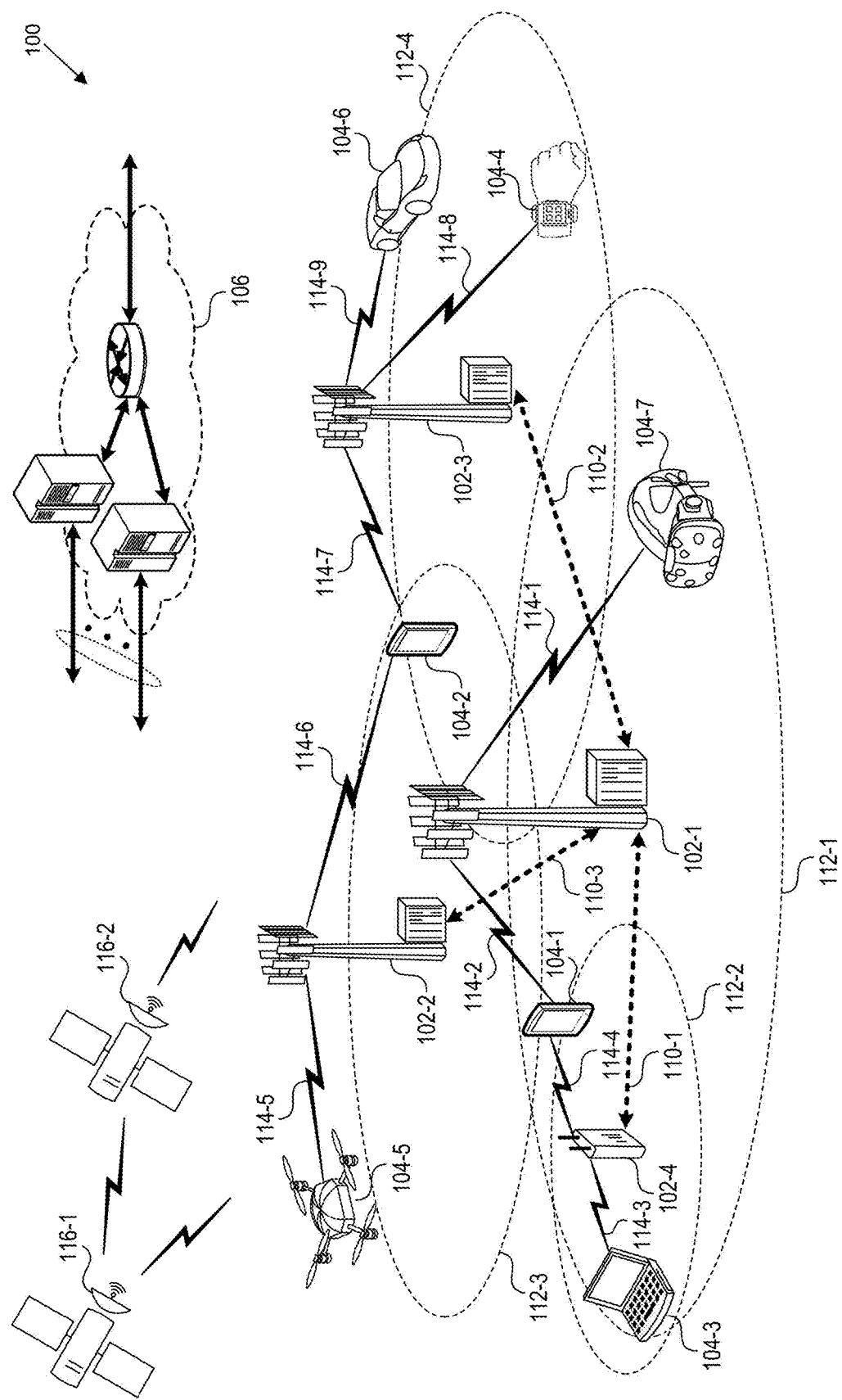
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present disclosure provides companion or auxiliary units configured for local and portable testing of network user devices of a telecommunication network, and methods related thereto. According to example embodiments, a companion or auxiliary testing unit is a portable unit that can be distributed to network subscribers to connect to their network user devices. A companion or auxiliary unit can be locally coupled (e.g., via wired connection such as a cable) with a network user device to command the network user device to perform prescribed or predetermined network operations (e.g., telephone calls, text messaging, and Internet or data network access sessions) relevant to a testing of the telecommunication network and/or the device itself. In particular, the unit can, via commands transmitted to the device, configure native logging functionality of the device in order to efficiently collect log data specifically in the durations when the device is performing the network operations, and the unit serves as a storage medium for the log data that is separate from the device itself.

Example embodiments of a companion or auxiliary testing unit and methods related thereto address technical challenges currently experienced with network and device testing. As previously discussed, testing can require or involve network user devices being remotely and sparsely located (e.g., for a network test relating to network service quality in those remote locations). The portability exemplified by the example embodiments described herein fulfills the challenge of remotely controlling these devices for a test; the network operator can ship and distribute the testing units to the network subscribers to operate. Portable embodiment of the testing apparatus is a technical improvement over some example existing systems and techniques limited to in-lab testing with bulky equipment or drive testing with non-insignificant consumption/use of transportation resources (e.g., fuel, man-hours). Furthermore, the network operator configuring and providing these testing units to network subscribers can maintain data privacy and security, as the testing units can preclude a need for the network subscribers to install third-party testing or data-logging tools on their devices.

Yet another technical benefit of the auxiliary testing units and the related methods is a minimal interruption and interference with device performance. According to example embodiments, the auxiliary testing units are configured to strictly enable device logging functionality when log data is needed, thus avoiding unnecessary data logging. The auxiliary testing units also quickly extract the logged device system data and store the data onboard the unit such that the testing places minimal load on device memory resources. Subsequent to the network user device (a device-under-test, or DUT) generating the device system data pertaining to a network event/process/operation being tested, the network user device plays a minimal role in the testing; the auxiliary testing unit instead handles storage, management, processing, and communication of the device system data. With the auxiliary testing unit, the network user device can be operated and used (e.g., by a network subscriber) normally without an interference of network testing.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.
Example Wireless Communications Systems FIG. 1 is a block diagram that illustrates a wireless telecommunications network 100 ("network 100") with which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays (HMDs) with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Example 5G Core Network Functions

Figure 2:
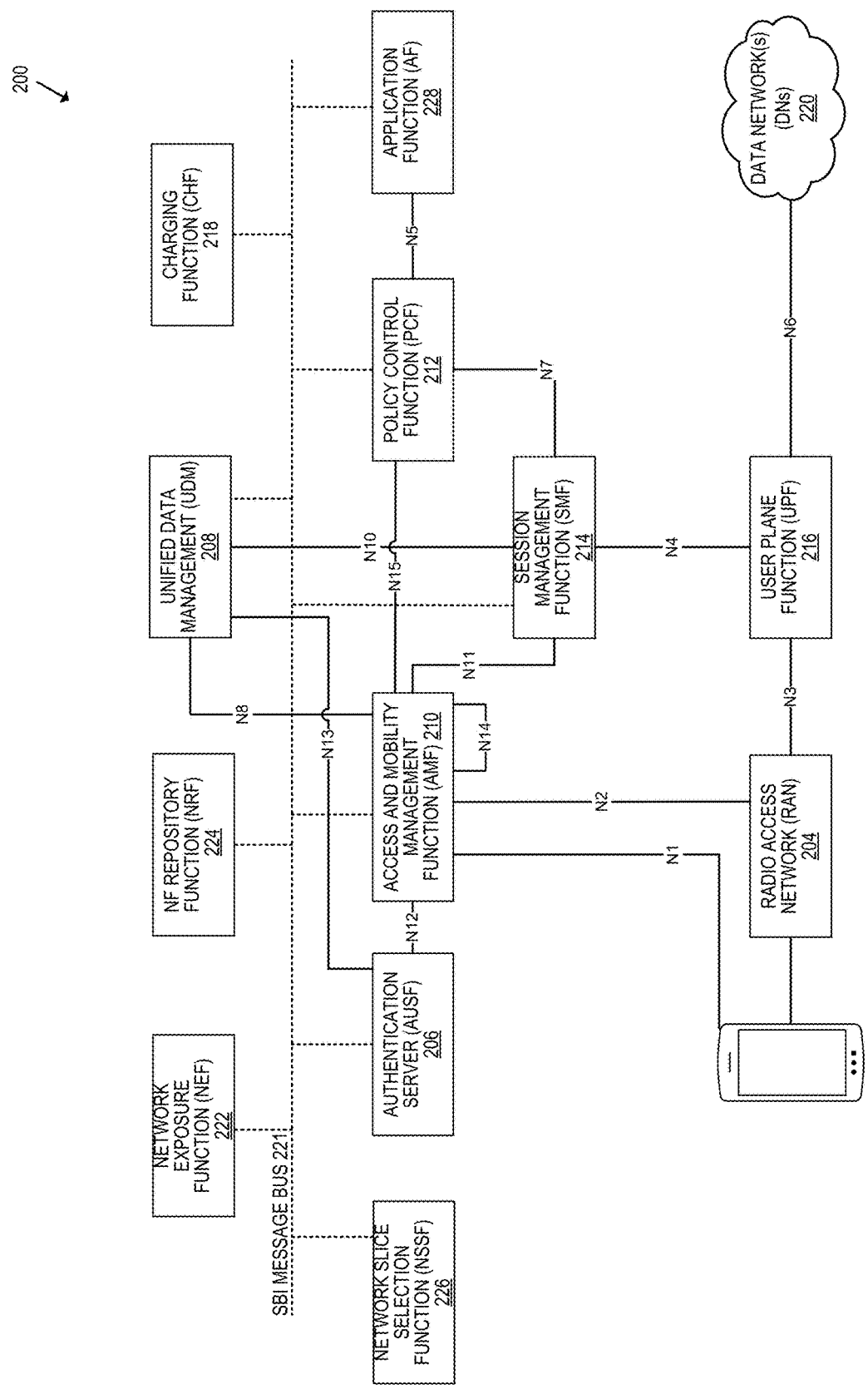
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example Systems for Testing of Network User Devices

Example embodiments described herein provide auxiliary testing units (also referred to or understood as companion units, peripheral testing devices, or the like) via which network user devices can be remotely tested. Via the auxiliary testing units, DUT data can be efficiently and reliably extracted and retrieved for analysis, for example, correlation with network-side data to better understand faults or errors with various network events, operations, processes, or the like.

Figure 3:
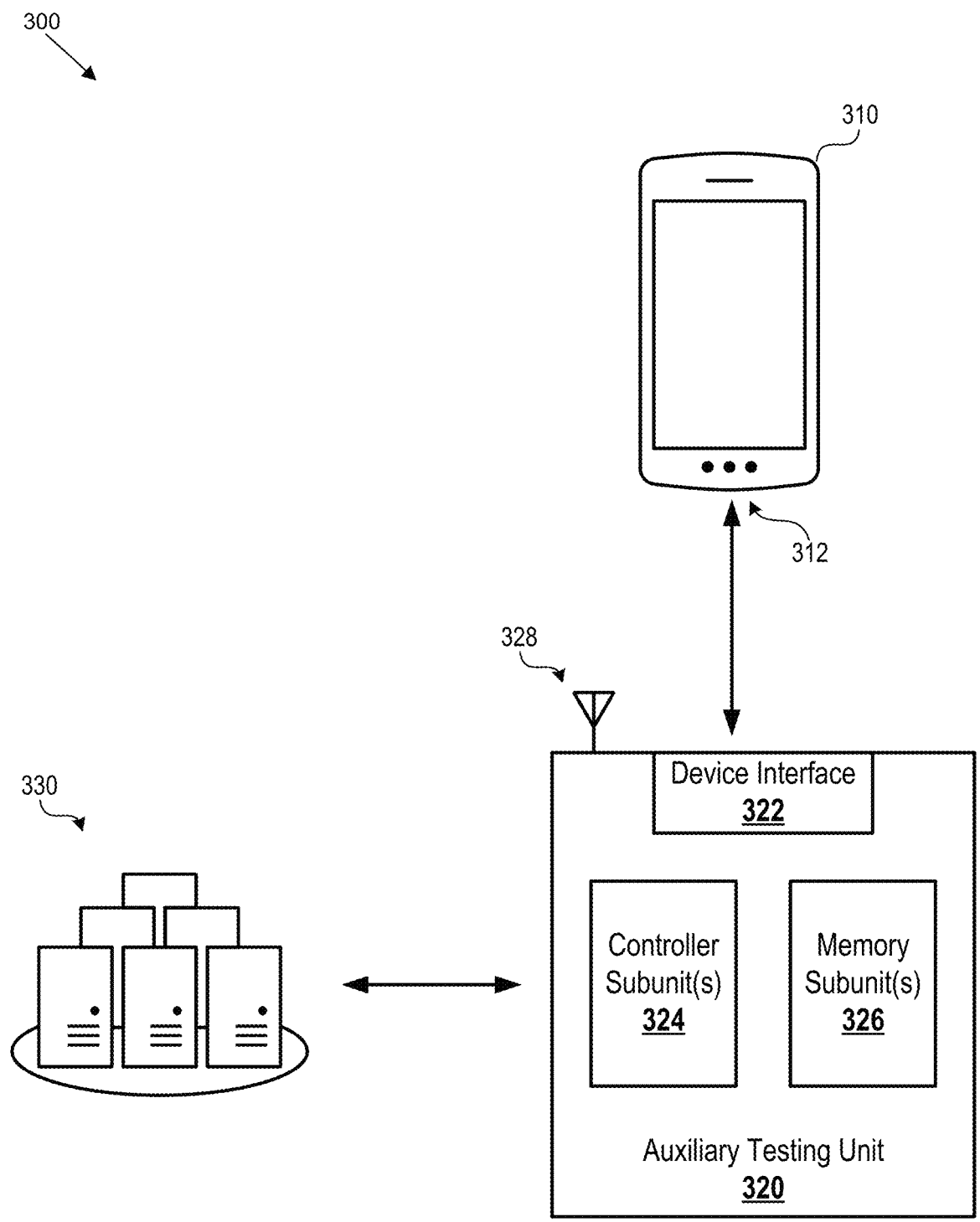
FIG. 3 is a block diagram that illustrates a system for local and portable testing of network user devices of a telecommunication network via auxiliary testing units configured to be locally coupled to the network user devices.

FIG. 3 illustrates an example system 300 for remote, distributed, portable, or local testing of network user devices of a telecommunication network. As illustrated, the example system 300 includes a DUT 310, an auxiliary testing unit 320 couplable with the DUT 310, and a remote system 330 for implementing and analyzing a test of the DUT 310 and/or a telecommunication network to which the DUT 310 is connected. In some examples, the DUT 310 is a network user device such as a smartphone, a tablet, a laptop, a wearable device, an extended reality (XR) device, a drone vehicle, or other wireless device that is designed and/or intended to use the telecommunication network. The DUT 310 may be subject to testing based on the DUT 310 being a new device model, based on the telecommunication network incorporating a network feature that is new/updated or under test (e.g., Voice over New Radio (VoNR), handover flows, registration flows), and/or the like. Based on testing objectives (e.g., with respect to device capabilities/compatibility, with respect to network operation or network service quality), the DUT 310 can be selected by a network operator of the telecommunication network and/or an original equipment manufacturer (OEM) of the device for a test.

The auxiliary testing unit 320 is configured to be coupled with the DUT 310, for example via a port 312 of the DUT 310. Depending on the device, the port 312 of the DUT 310 can be configured according to connectivity and/or periphery interface standards and protocols, such as Universal Serial Bus (USB), High-Definition Multimedia Interface (HDMI), or any other input-output interface protocol. In some embodiments, the auxiliary testing unit 320 includes a device interface 322 including one or more ports, such that the auxiliary testing unit 320 and the DUT 310 can be coupled to one another via a physical cable or wire connected to the port 312 of the DUT 310 and the device interface 322 of the auxiliary testing unit 320. In some embodiments, the device interface 322 includes multiple ports, cable connectors (e.g., male connectors), or interface components that are configured according to different connectivity/interface standards or protocols, thus allowing the auxiliary testing unit 320 to flexibly or adaptively connect to a DUT 310 or devices with different connectivity specifications.

As shown in FIG. 3, the auxiliary testing unit 320 can further comprise one or more controller subunits 324 and one or more memory subunits 326. According to example embodiments, the one or more memory subunits 326 comprises a memory drive (e.g., a hard drive, a solid-state drive) configured to store device system data generated/logged by the DUT 310, and with the memory drive, the auxiliary testing unit 320 can serve as a data storage medium or repository for the device system data. As device system data is stored by the memory subunits 326 of the auxiliary testing unit 320, memory storage resources of the DUT 310 can be conserved and better managed. In some embodiments, the memory drive is an external device that is communicably coupled with the auxiliary testing unit 320 (or the controller subunits 324 of the auxiliary testing unit 320) via a device interface 322 of the auxiliary testing unit 320. Thus, the data storage capabilities of the auxiliary testing unit 320 can be modular and scalable. For example, for a more extensive test of the DUT 310 and/or the telecommunication network, additional memory drives for storing device system data can be attached to and used with the auxiliary testing unit 320.

The one or more controller subunits 324 of the auxiliary testing unit 320 implement example operations described herein to cause the auxiliary testing unit 320 to control the DUT 310 to perform prescribed network operations/processes, to extract/obtain/retrieve device system data from the DUT 310, and to transmit the device system data to the remote system 330 for processing and analysis. For example, the one or more controller subunits 324 can determine and define certain network operations/processes to be performed by the DUT 310 and generates shell commands for the certain network operations/processes that are then injected into or transmitted to the DUT 310 (e.g., via the device interface 322). The one or more memory subunits 326 can include a non-transitory computer-readable storage medium that stores instructions that are executable by the one or more controller subunits 324 to perform the example operations described herein. In some embodiments, the one or more controller subunits 324 can include a microprocessor, a microcontroller, a processor, and/or the like.

The certain network operations/processes determined by the auxiliary testing unit 320 include mobile-originated processes, or processes/flows initiated by the DUT 310. For example, the auxiliary testing unit 320 can command the DUT 310 to perform an outbound telephone call via the telecommunication network, to transmit a text message via the telecommunication network, and/or the like. Based on testing requirements, the auxiliary testing unit 320 prescribes and triggers these mobile-originated processes based on testing objectives or requirements; for example, the auxiliary testing unit 320 commands the DUT 310 to perform an outbound telephone call having a particular duration, to perform an outbound telephone call to a particular endpoint, to transmit a text message with particular media data or file attachments, and/or the like. Thus, various parameters or attributes of the network operations/processes prescribed for the DUT 310 can be determined by the auxiliary testing unit 320.

The remote system 330 coordinates the network and/or device testing involving the DUT 310 with the auxiliary testing unit 320. In some embodiments, the remote system 330 and the auxiliary testing unit 320 are configured to wirelessly communicate with one another in order for the auxiliary testing unit 320 to determine (e.g., receive an indication of from the remote system 330) the network operations/processes to be performed by the DUT 310 and for the auxiliary testing unit 320 to return the device system data generated/logged by the DUT 310 during the network operations/processes to the remote system 330. In some embodiments, the auxiliary testing unit 320 comprises a wireless antenna 328 that enables the wireless communication with the remote system 330, and the auxiliary testing unit 320 can communicate with the remote system 330 via a local area network, a telecommunication network (e.g., the telecommunication network being tested, the telecommunication network to which the DUT 310 subscribes), and/or the like. In some embodiments, the auxiliary testing unit 320 comprises a subscriber identity module (SIM) that permits the auxiliary testing unit 320 to use the telecommunication network to communicate with the remote system 330. For example, the SIM of the auxiliary testing unit 320 is configured under a testing mode or a testing subscriber identify that has unmetered use of the telecommunication network. In various examples, the SIM of the auxiliary testing unit 320 can be a physical SIM, a virtual SIM (e.g., an eSIM), and/or the like.

In some embodiments, the remote system 330 can serve as a larger warehouse or aggregator of device system data logged by network user devices. For example, the remote system 330 is or comprises a cloud storage platform or system on which large volumes of device system data provided by auxiliary testing units can be stored.

In some examples, the auxiliary testing unit 320 can communicate with auxiliary testing units coupled to other devices, for example, to test network processes/flows involving more than one network user device (e.g., a telephone call, text messaging). For example, the auxiliary testing unit 320 can be notified, for example directly from another auxiliary testing unit or via the remote system 330, that the DUT 310 is designated as an endpoint for a mobile-terminated network process (e.g., receiving a telephone call, receiving a text message), and in response to the notification, the auxiliary testing unit 320 performs example operations described herein to make the DUT 310 log device system data during the mobile-terminated network process.

Figure 4:
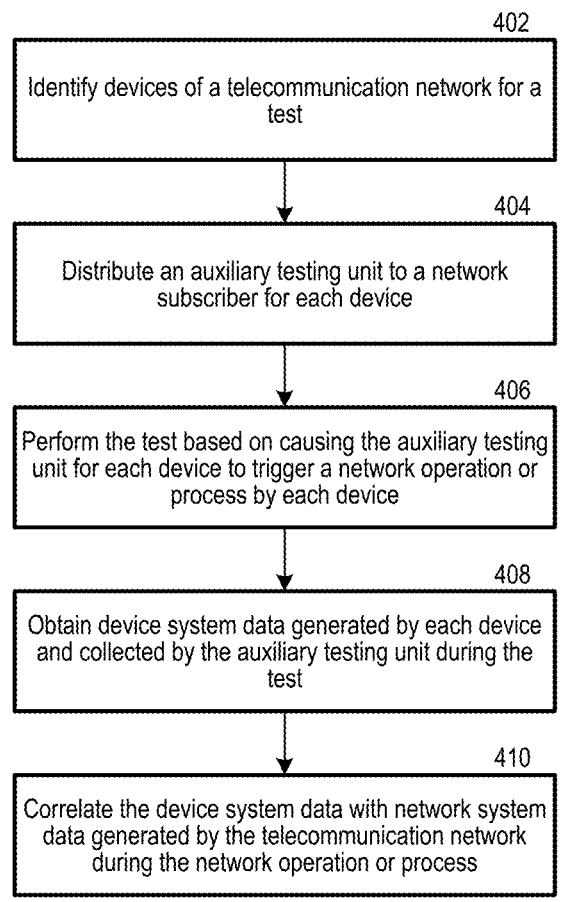
FIG. 4 is a flow diagram of a method by a network operator of a telecommunication network to locally and portably test network user devices via auxiliary testing units.

FIG. 4 illustrates an example method including operations by a network operator for implementing or operating a system for remote, distributed, portable, or local testing of network user devices (e.g., the system 300 of FIG. 3). At 402, the network operator identifies a plurality of network user devices of a telecommunication network for a test. The test may relate to testing a new device model produced by an original equipment manufacturer (OEM) for its compatibility with the telecommunication network, testing a particular function or capability of the telecommunication network (e.g., Voice over Long-Term Evolution (VOLTE), Voice over New Radio (VoNR)), testing service quality of the telecommunication network (e.g., coverage areas of the network), and/or the like. Based on the test, the network operator can identity network user devices that are located in one or more particular locations, network user devices associated with a common OEM and/or device model, and/or the like.

At 404, the network operator distributes an auxiliary testing unit to a network subscriber for each of the plurality of network user devices. The network operator can store subscriber information (e.g., a network subscriber profile) that specifies a mailing address or home address of the network subscriber operating a network user device identified for the test, and the network operator can send an auxiliary testing unit to the network subscriber using this subscriber information. According to example embodiments, the auxiliary testing unit is embodied in a portable configuration, for example encapsulated in a casing of hand-held scale and/or a casing that is not larger than the network user device itself. Thus, the network operator can include or incorporate large populations of network user devices for a test based on a convenience of distributing auxiliary testing units embodied in portable configurations.

At 406, the network operator can perform the test. In some examples, the test involves the network user devices initiating or performing mobile-originated network processes (e.g., making a telephone call to another mobile endpoint, transmitting a text message), and the network operator can perform the test based on causing the auxiliary testing unit for each network user device to trigger or command the network user device to perform the mobile-originated network process. In particular, the network operator can use a remote system to communicate with the auxiliary testing units, the remote system notifying the auxiliary testing units of the network processes or operations prescribed for the network user devices. For example, the remote system triggers the auxiliary testing units to start tests. In some embodiments, the trigger by the remote system includes instructions specifying testing parameters.

At 408, the network operator obtains device system data generated/logged by each device during the test. In particular, the device system data that is logged by each device is collected by and locally stored on the auxiliary testing unit for each device, and the auxiliary testing units can wirelessly transmit the device system data to the remote system.

At 410, the network operator correlates the device system data of the network user devices with network-side data (e.g., network system data generated/logged by core network functions, by network access nodes, and/or the like) generated during the test in order to identify potential faults or errors related to the tested features/functions/processes. In particular, the device-side perspective provided by the device system data collected via the auxiliary testing units, in combination with the network-side perspective, provides improved understanding of the network processes involved in the test. For example, the network operator can determine that a new device model has an issue with supporting VoNR based on an error with certain Transmission Control Protocol (TCP) packets sent/received by the new device model, as indicated within the device system data logged by the new device model. If the network operator discovers any issues related to the network user devices, the network operator can indicate these issues to an OEM of the network user devices.

Example Operations for an Auxiliary Testing Unit

According to example embodiments, an auxiliary testing unit is a portable companion unit or device that couples with a network user device or device-under-test in order to extract device system data logged by the DUT and provide the device system data to remote systems or platforms for processing or analysis. Physical lightweight embodiments of the auxiliary testing unit enable mass and far-reaching testing across a telecommunication network.

Figure 5:
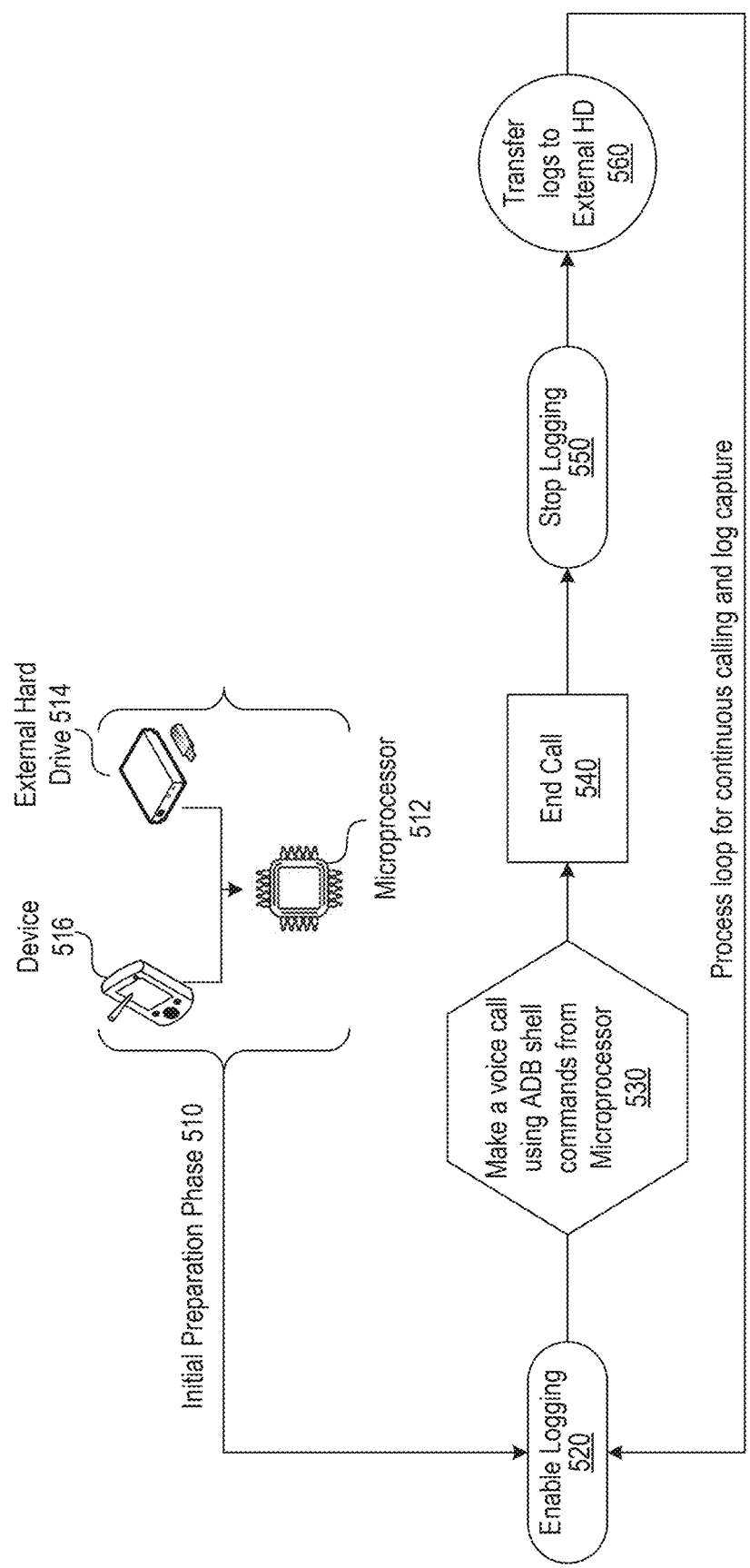
FIG. 5 is a flow diagram for local and portable testing of network user devices of a telecommunication network via auxiliary testing units.

FIG. 5 illustrates a flow diagram with example operations for an auxiliary testing unit to locally collect device system data of a DUT during a test. The illustrated example includes an initial preparation phase 510, in which an auxiliary testing unit that comprises a controller 512 (e.g., a microprocessor) and a memory device 514 (e.g., an external hard drive) is coupled with a DUT 516. The auxiliary testing unit can be a portable and compact unit in which the controller 512 and the memory device 514 are packaged together. The auxiliary testing unit (or its controller 512) can be coupled with the DUT 516 via physical connections supported by the DUT 516 (e.g., USB connections, HDMI connections). The auxiliary testing unit and the DUT can be coupled together during the initial preparation phase 510 by a user of the DUT, as instructed by a network operator that is testing the DUT and/or a telecommunication network to which the DUT subscribes.

At 520, a logging capability of the DUT 516 is enabled. In some embodiments, the auxiliary testing unit (or its controller 512) enables the logging capability of the DUT 516 via a shell command that the auxiliary testing unit transmits to the DUT 516. The shell command can be configured according an operating system (OS) of the DUT 516; for example, the auxiliary testing unit (or its controller 512) implements OS-specific tools for communicating with and controlling the DUT 516. For example, the auxiliary testing unit implements the Android Debug Bridge command-line tool for DUTs implementing an Android-based operating system. In some embodiments, the logging capability of the DUT 516 includes the DUT 516 logging data of multiple system layers (e.g., according to the Open Systems Interconnection (OSI) model). For example, with its logging capability enabled, the DUT 516 can log at least two of physical layer data, network layer data, transport layer data, or kernel data.

At 530, the DUT 516 makes a voice call as commanded by the auxiliary testing unit (or its controller 512). The voice call is part of the network operations/processes being tested, and the voice call can be prescribed (e.g., with respect to parameters such as a duration, an endpoint/recipient, and/or the like) by the auxiliary testing unit. As with enabling logging capability, the auxiliary testing unit can command the DUT 516 to make the voice call via shell commands.

At 540, the DUT 516 ends the voice call. In particular, the DUT 516 can end the voice call at the command of the auxiliary testing unit. The making and ending of the voice call at the DUT 516 can be commanded by the auxiliary testing unit based on the auxiliary testing unit executing an automated script of commands for the voice call. The auxiliary testing unit can determine the automated script of commands for the voice call, receive the automated script of commands for the voice call from a remote server, or receive the automated script of commands from another auxiliary testing unit.

At 550, in connection with the DUT 516 ending the voice call, the auxiliary testing unit commands the DUT 516 to stop or disable its logging capability. In doing so, the auxiliary testing unit causes the DUT 516 to only collect device system data in the duration of the voice call or relevant network operation/process being tested.

At 560, the auxiliary testing unit transfers the logs or device system data collected by the DUT 516 to the memory device 514 of the auxiliary testing unit. In doing so, the device system data is immediately retrieved off of the DUT 516, such that the DUT 516 is able to free up its memory storage resources. In some embodiments, the auxiliary testing unit can hold the logs or device system data for the voice call in the memory device 514 before sending the logs or device system data to a remote server. As shown in FIG. 5, a process loop for continuous calling and log capture can repeat, with logging being enabled/disabled for additional voice calls, text messaging, data network or Internet access sessions, and/or the like being performed by the DUT 516. In some embodiments, the auxiliary testing unit continues to hold device system data in the memory device 514 until a testing condition is satisfied. Examples of testing conditions can include a minimum number of network operations (e.g., voice calls) being performed by the DUT 516, a threshold memory size associated with the memory device 514, and/or the like.

Figure 6:
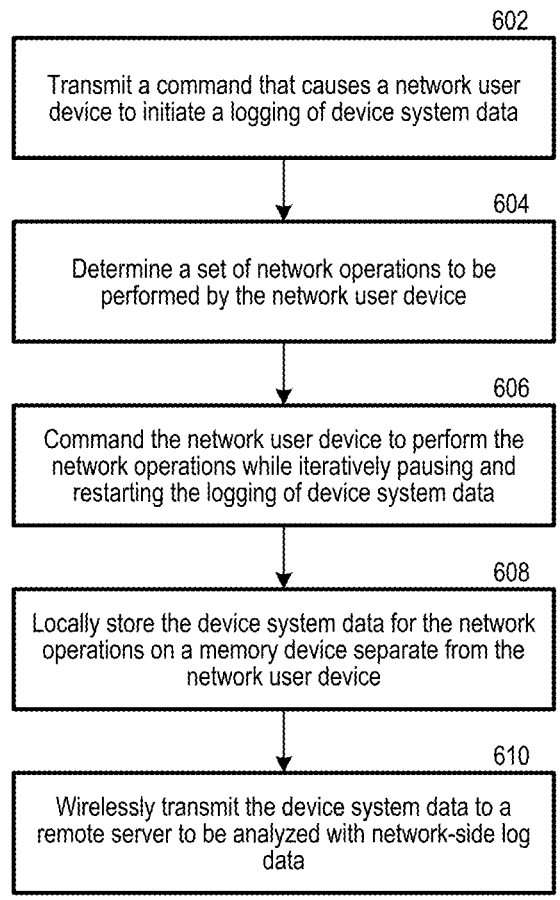
FIG. 6 is a flow diagram that illustrates example operations implemented by an auxiliary testing unit to locally and portably perform testing of a network user device of a telecommunication network.

FIG. 6 illustrates another flow diagram comprising example operations implemented by an auxiliary testing unit. The auxiliary testing unit can perform the example operations based on a controller of the auxiliary testing unit executing instructions stored by a non-transitory computer-readable storage medium. At 602, the unit transmits, to a network user device, a command that causes the network user device to initiate a logging of device system data.

At 604, the unit determines a set of network operations to be performed by the network user device. In some embodiments, the network operations can relate to a testing of a compatibility of the network user device with the telecommunication network (or specific services or features provided by the telecommunication network) and/or of a quality of communication services received by the network user device from the telecommunication network. In some examples, the network operations can include making outgoing telephone calls, transmitting text messages, initiating a data network (e.g., Internet) access session, and/or the like. Determining these network operations includes determining parameters or attributes of the network operations, such as a duration of a telephone call or a size of a text message. In some examples, these parameters or attributes can be determined based on an expected memory size of the device system data that would be logged for the network operations. Accordingly, the unit can determine network operations that are optimized to minimize load or occupancy of memory storage resources of the network user device.

In addition to or in alternative to such network operations originating from the network user device, the network operations can include receiving incoming telephone calls, receiving text messages, and/or the like, in some examples. Determining such incoming/inbound network operations comprises receiving an indication of the telephone call or the text message from a remote server managing the test or from another auxiliary testing unit coupled to and operating with another network user device from which the telephone call or text message originates. In some embodiments, when determining outgoing/outbound network operations, the unit can likewise identify another auxiliary testing unit coupled to and operating with a target network user device that receives an outgoing telephone call or outbound text message. The unit and other auxiliary testing units can wirelessly communicate over the telecommunication network. This communication between auxiliary testing unit can ensure that local logging of device system data for network processes spanning multiple devices can be synchronously and/or simultaneously performed.

In some embodiments, the network operations includes a voice call, and the unit determines or identifies a telephonic address line or telephone number to which the voice call is addressed. In some embodiments, the telephonic address line or telephone number identifies a subscriber station or endpoint to which the network subscriber associated with the network user device has unlimited or unmetered access, such as a test line set up for network/device testing.

At 606, the unit commands the network user device to perform the network operations while iteratively pausing and restarting the logging of device system data. In particular, the unit pauses the logging of device system data between the network operations when the network user device is not performing the network operations, and the unit restarts the logging of device system when the network user device performs the network operations. As such, the unit can efficiently manage the network user device's memory storage resources during a test.

At 608, the unit locally stores the device system data for the network operations. The unit comprises a memory device that is separate from the network user device, and the unit stores the device system data on the memory device. To store the device system data on the memory device, the unit retrieves the device system data from the network user device, for example, via input/output (I/O) or peripheral protocols implemented by the network user device. Retrieval of the device system data can be performed based on the unit transmitting a command to the network user device to transmit the device system data to the unit. In some embodiments, the network user device first stores the device system data, and then the unit retrieves the data from the network user device. In this way, the transfer of device system data from the network user device to the unit can occur in batches. In some embodiments, the network user device, when logging, generates the device system data and directly streams the device system data to the unit. As such, the unit locally stores the device system data based on receiving a stream of device system data generated by the network user device.

At 610, the unit wirelessly transmits the device system data to a remote server for the device system data to be analyzed with network-side log data corresponding to the network operations. In some embodiments, the unit wirelessly transmits the device system data that is collected over time for the multiple network operations in response to a testing condition being satisfied. Examples of testing conditions that trigger the unit transmitting logs (the device system data) to the remote server can include an end time specified by the remote server, a requisite number of network operations being performed, a threshold memory size associated with the memory device of the unit, and/or the like. In some examples, for example if the testing condition is a threshold memory size of the unit's memory device, the unit can delete the device system data subsequent to transmitting the device system data to the remote server.

Computer System

Figure 7:
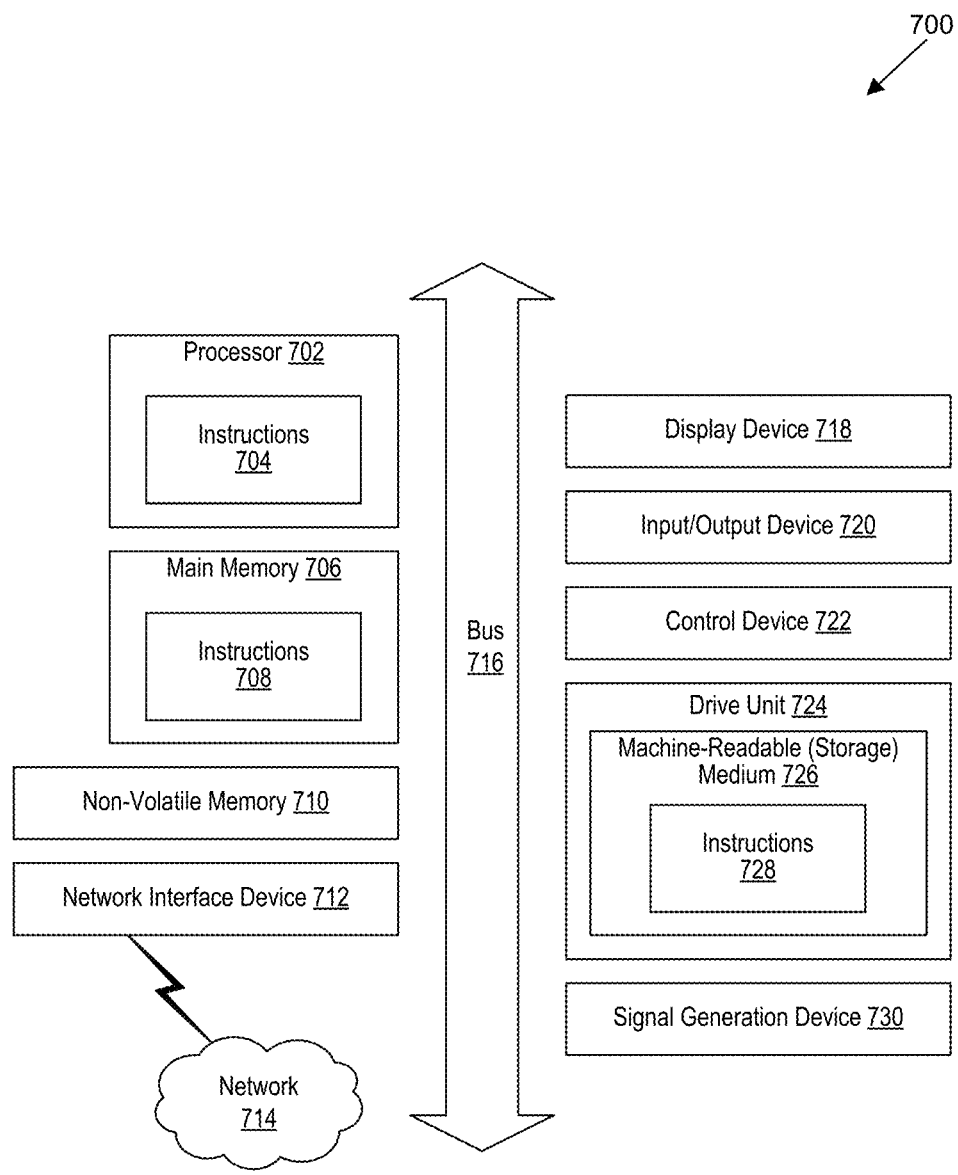
FIG. 7 is a block diagram that illustrates an example of a computing system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. An auxiliary testing unit for local device testing in remote network areas, the auxiliary testing unit comprising:
   an onboard memory subunit;
   a peripheral interface for communicatively coupling the auxiliary testing unit with a mobile device;
   an onboard antenna; and
   a controller subunit comprising at least one processor and at least one non-transitory memory storing instructions that, when executed by the at least one processor, cause the controller subunit to:
   transmit, via the peripheral interface to the mobile device, a command that causes the mobile device to log device system data of the mobile device;
   determine mobile-originated network operations to be performed by the mobile device via a telecommunication network for testing a compatibility of the mobile device with the telecommunication network;
   trigger, via the peripheral interface, the mobile device to perform the mobile-originated network operations on the telecommunication network, wherein triggering the mobile device comprises:
   (i) temporarily pausing a logging by the mobile device of the device system data of the mobile device between the mobile device performing each mobile-originated network operation, such that portions of the device system data logged over time correspond with a performance by the mobile device of a respective mobile-originated network operation, and (ii) causing the mobile device to store the portions of the device system data at the mobile device;

retrieve, via the peripheral interface, and store, in the onboard memory subunit, the portions of the device system data stored at the mobile device; and in response to a condition being satisfied, wirelessly transmit, via the onboard antenna, the portions of device system data to a remote server configured to associate the portions of device system data with network-side log data of the telecommunication network.

2. The auxiliary testing unit of claim 1, wherein the mobile-originated network operations comprise at least one of: a mobile-originated telephonic call via the telecommunication network, a text message transmitted over the telecommunication network, or a data network access session of the mobile device over the telecommunication network.

3. The auxiliary testing unit of claim 2, wherein determining the mobile-originated network operations comprises identifying a telephonic address line to which a subscriber of the mobile device is configured with unlimited access.

4. The auxiliary testing unit of claim 2, wherein determining the mobile-originated network operations comprises determining a duration of the mobile-originated telephonic call based on an expected memory size of a particular portion of the device system data that is logged for the duration of the mobile-originated telephonic call.

5. The auxiliary testing unit of claim 1, wherein the condition comprises the portions of device system data exceeding a memory size limit associated with the onboard memory subunit, and wherein the instructions further cause the controller subunit to:

subsequent to wirelessly transmitting the portions of device system data to the remote server, delete the portions of device system data from the onboard memory subunit.

6. The auxiliary testing unit of claim 1, wherein the onboard memory subunit, the peripheral interface, and the controller subunit are packaged in a portable casing that is smaller than the mobile device.

7. The auxiliary testing unit of claim 1, wherein the peripheral interface comprises a plurality of cable ports, at least two of which being configured according to a different physical interface protocol.

8. The auxiliary testing unit of claim 1, further comprising:

a subscriber identity module (SIM) that is used by the controller subunit to wirelessly transmit the portions of device system data to the remote server over the telecommunication network via which the mobile-originated network operations are performed by the mobile device.

9. The auxiliary testing unit of claim 1, wherein the controller subunit is caused to trigger the mobile device to perform the mobile-originated network operations based on transmitting, via the peripheral interface to the mobile device, shell commands that are configured according to an operating system (OS) of the mobile device.

10. The auxiliary testing unit of claim 1, wherein the device system data logged by the mobile device comprises at least two of physical layer data, network layer data, or transport layer data.

11. The auxiliary testing unit of claim 1, wherein determining the mobile-originated network operations comprises:

identifying a mobile-terminated endpoint for a particular mobile-originated network operation based on the mobile-terminated endpoint being communicatively coupled with a second auxiliary testing unit; and wirelessly communicating with the second auxiliary test unit coupled to the mobile-terminated endpoint to cause synchronous logging of respective device system data by the mobile device and by the mobile-terminated endpoint during the particular mobile-originated network operation.

* * * * *